(12) United States Patent
Seger et al.

(10) Patent No.: US 7,307,415 B2
(45) Date of Patent: Dec. 11, 2007

(54) CONTACTLESS ANGULAR POSITION SENSOR AND METHOD FOR SENSING ANGULAR POSITION OF A ROTATABLE SHAFT

(75) Inventors: Eric Seger, Rockford, IL (US); Wesley Burandt, Rockford, IL (US); Andrew Steuer, Rockford, IL (US); Gary L. Frederick, Rockford, IL (US)

(73) Assignee: BVR Technologies Co., Rockford, IL (US)

( * ) Notice: Subject to any disclaimer, the term of this patent is extended or adjusted under 35 U.S.C. 154(b) by 0 days.

(21) Appl. No.: 10/367,459

(22) Filed: Feb. 14, 2003

(65) Prior Publication Data

US 2003/0218458 A1    Nov. 27, 2003

Related U.S. Application Data

(60) Provisional application No. 60/357,280, filed on Feb. 14, 2002.

(51) Int. Cl.
*G01B 7/30* (2006.01)
(52) U.S. Cl. .............................. 324/207.2; 324/207.25
(58) Field of Classification Search ............. 324/207.2, 324/207.12, 207.21, 207.22, 207.25, 166, 324/173, 174; 338/32 H, 32 R
See application file for complete search history.

(56) References Cited

U.S. PATENT DOCUMENTS 4,373,486 A    2/1983    Nichols
(Continued)

FOREIGN PATENT DOCUMENTS

DE         19820014 A1    11/1999
(Continued)

OTHER PUBLICATIONS

ESP@CENET (European Patent Office), Abstract of DE 19820014, http://v3.espacenet.com.

(Continued)

*Primary Examiner*—Jay M Patidar
(74) *Attorney, Agent, or Firm*—Keith Frantz

(57) ABSTRACT

A contactless rotary shaft position sensor provides for precision computation of shaft angle for a wide range of input shaft rotational angles. The sensor includes two annular two-pole magnets which are connected by a precision, motion-transmitting gear train. An optional second gear train between one of the magnets and the input shaft can provide additional angular rotation scaling to accurately measure either fractional or a large number of multiple turns of the input shaft. The gear ratios are selected such that one of the magnets does not rotate more than one revolution. Pairs of ratiometric Hall-effect or magnetoresistive sensors provide differential voltage signals which are used for sensing angular position of each magnet over a full 360 degrees of rotation. The single-turn magnet provides an absolute, coarse indication of input shaft rotation with a typical accuracy of 2%. The gear ratio between the magnets produces several turns of the second magnet for each turn of the single-turn magnet. Since the gear ratio between the magnets is fixed, the angle sensed for the multi-turn magnet can be predicted from the position of the single-turn magnet. This is compared to the multi-turn magnet's actual sensed rotation. The result is an improvement in accuracy directly proportional to the gear ratio between the magnets. Computation of the individual magnet rotation angles and the input shaft angle is performed using a microprocessor and appropriate signal conditioning circuits. Utilizing two magnets, input shaft rotation can be accurately measured to within 0.1% of maximum range.

35 Claims, 7 Drawing Sheets

U.S. PATENT DOCUMENTS

| | | |
|---|---|---|
| 4,425,557 A | 1/1984 | Nakamura |
| 4,570,118 A | 2/1986 | Tomczak |
| 4,719,419 A | 1/1988 | Dawley |
| 5,004,981 A * | 4/1991 | Hashimoto et al. .... 324/207.22 |
| 5,159,268 A | 10/1992 | Wu |
| 5,444,369 A | 8/1995 | Luetzow |
| 5,481,188 A * | 1/1996 | Mizutani ............... 324/207.25 |
| 5,574,364 A | 11/1996 | Kajimoto et al. |
| 5,602,471 A | 2/1997 | Muth |
| 5,646,523 A * | 7/1997 | Kaiser et al. ............ 324/207.2 |
| 5,650,721 A | 7/1997 | Van Den Berg |
| 5,731,702 A | 3/1998 | Schroeder |
| 5,744,950 A | 4/1998 | Seefeldt |
| 5,754,042 A | 5/1998 | Schroeder |
| 5,796,249 A | 8/1998 | Andra et al. |
| 5,850,142 A | 12/1998 | Rountos |
| 5,861,745 A | 1/1999 | Herden |
| 6,064,197 A | 5/2000 | Lochmann |
| 6,130,535 A | 10/2000 | Herden |
| 6,137,288 A | 10/2000 | Luetzow |
| 6,155,126 A * | 12/2000 | Vogt et al. ..................... 74/335 |
| 6,327,927 B1 * | 12/2001 | Rogg et al. ................... 74/335 |
| 6,354,396 B1 * | 3/2002 | Horton et al. .............. 180/446 |
| 6,542,088 B1 | 4/2003 | Bielski |
| 6,573,670 B2 * | 6/2003 | Machalek et al. ............ 318/15 |

FOREIGN PATENT DOCUMENTS

| | | |
|---|---|---|
| WO | WO 98/54547 | 12/1998 |

OTHER PUBLICATIONS

ESP@CENET (European Patent Office), English Translation of Description of DE 19820014, http://v3.espacenet.com.

ESP@CENET (European Patent Office), English Translation of Claims of DE 19820014, http://v3.espacenet.com.

* cited by examiner

TYPICAL GEAR RATIOS VS. RANGE OF INPUT SHAFT ROTATION

| INPUT TURNS | INPUT GEAR RATIO | INPUT MAGNET TURNS | INTER-MAGNET GEAR RATIO |
|---|---|---|---|
| 1 | NONE | 1 | 1:20 |
| 20 | NONE | 20 | 20:1 |
| 480 | 24:1 | 20 | 20:1 |
| 1/12 | 1:12 | 1 | 1:20 |

FIG. 2

CONTACTLESS ANGULAR POSITION SENSOR AND METHOD FOR SENSING ANGULAR POSITION OF A ROTATABLE SHAFT

CROSS-REFERENCES TO RELATED APPLICATIONS

This application claims priority benefit to U.S. Provisional Patent Application Ser. No. 60/357,280, filed Feb. 14, 2002.

REFERENCE TO MICROFICHE APPENDIX

N/A.

STATEMENT REGARDING FEDERALLY SPONSORED RESEARCH OR DEVELOPMENT

N/A.

BACKGROUND OF THE INVENTION 1. Field of Invention

This invention relates to rotary shaft angular position sensors and, more specifically, to contactless angular sensors adapted to produce precise, linear output signals proportional to shaft position for a wide range of rotational input angles, and associated methods. 2. Description of Prior Art Shaft angular position sensing such as in rotary motion control and other applications, has been traditionally accomplished using potentiometers, synchros, or resolvers which include low reliability electrical contact arrangements such as electrical brushes and wipers. Newer technologies for angular position sensing includes optical encoders which are unreliable in low temperature, moist environments. The need for high reliable shaft angle sensing for aircraft control surfaces and closed loop actuators has led to the application of rotary variable differential transformers and brushless resolvers. Unfortunately, these sensors are substantially more expensive, they require AC excitation and demodulation electronics to obtain useable output signals, resulting in additional complexity and cost, and they do not provide for inherent digital signals that are desired for most modern automation systems.

Hall-effect and magnetoresistive (MR) sensors are relatively low cost sensors capable of generating an electrical output signal when exposed to a rotating magnetic field. Hall-effect sensors utilize a current-carrying semi-conductor membrane to generate a low voltage perpendicular to the direction of current flow when subjected to a magnetic field normal to the surface of the membrane. Magnetoresistive sensors utilize an element whose resistance changes in the presence of a changing external magnetic field. Hall-effect and magnetoresistive sensors have been historically limited to use for sensing motion over a limited angular range where a high degree of accuracy is not required. However, recent efforts to achieve a lower-cost, yet reliable and accurate device for sensing angular position of a rotary shaft have included attempts to utilize relatively low cost sensors such as Hall-effect devices or magnetoresistive sensors.

One group of prior devices to utilize these magnetic field sensors provides an output which is digital in nature, generating pulses as a function of shaft rotation or discrete signals for incremental shaft angles. Nichols, U.S. Pat. No. 4,373,486, Schroeder, U.S. Pat. Nos. 5,731,702 and 5,754,042, and Seefeldt, U.S. Pat. No. 5,744,950, use permanent magnet biased Hall-effect devices and magnetoresistive sensors, respectively, to sense the passage of notches on a shaft-driven wheel for engine ignition control. Kajimoto, U.S. Pat. No. 5,574,364, utilizes magnets imbedded into or polarized into the surface of the rotating wheel to provide a changing magnetic field direction as the surface of the wheel passes the sensors. The accuracy of such digital output signals is limited by the number of pulses per revolution of the wheel or shaft.

Another group of prior devices utilize these magnetic field sensors to provide analog output signals as a magnet attached to a shaft is rotated. van den Berg, U.S. Pat. No. 5,650,721, shows a two-pole rectangular bar magnet rotating over a giant MR layer. The rotation of the transverse field between the poles creates a unique, sine-wave-shaped analog output over 180 degrees of rotation. Linear output range is less than 60 degrees. Lochmann, U.S. Pat. No. 6,064,197, adds a Hall-effect device to sense axial field direction to provide a unique, but nonlinear, signal over 360 degrees. Andraet, U.S. Pat. No. 5,796,249, proposes the integration of at least three MR Wheatstone bridges under a bar magnet's transverse field to provide a set of nonlinear outputs that can be used to calculate a unique shaft angle. Haberli, International Publication WO98/54547, proposes a similar scheme utilizing two pairs of Hall-effect sensors located on diagonals under a square magnet to generate approximate sine and cosine signals as the shaft and magnet are rotated. Muth, U.S. Pat. No. 5,602,471, proposes use of multiple MR bridges to generate a variety of phase-spaced sinusoidal signals. The signals are forced to saturate within their linear range and then added to provide a summed output which is overall a linear function of shaft rotations, but can exhibit a variety of gain variations and discontinuities. None of these analog sensors are capable of precisely measuring shaft angle over a wide range of angles, or lend themselves to being compactly packaged around an axially continuing shaft, a feature desirable for integrating the sensor into a gearbox or actuator.

Other prior analog shaft angle sensors using magnetic flux sensors have attempted to increase the accuracy and linear range by shaping the magnets or pole pieces. Wu, U.S. Pat. No. 5,159,268, has generated a bell or oblong shaped two-pole magnet to get a linear range approaching 180 degrees. Rountos, U.S. Pat. No. 5,850,142, uses a pair of convex magnets and a spherical pole piece to generate a linear range of up to plus and minus 30 degrees for joysticks. Dawley, U.S. Pat. No. 4,719,419, uses a monopolar annular magnet, either mounted eccentric to the shaft or nonuniformly magnetized, to create a useable linear output of +45 degrees. Nakamura, U.S. Pat. No. 4,425,557, and Tomczak, U.S. Pat. No. 4,570,118 incline the sensor magnets relative to the axis of rotation in an attempt to improve output linearity. Luetzow, U.S. Pat. Nos. 5,444,369 and 6,137,288 and Herden, U.S. Pat. Nos. 5,861,745 and 6,130,535 use a combination of shaped magnets, pole pieces, and axis offsets to get a linear output range approaching 180 degrees.

Overall, the prior contactless shaft sensing devices provide a limited number of discrete pulses or have a small linear output range. They are often manufactured utilizing non-standard magnetic shapes and cannot be easily packaged around a rotating shaft. They do not provide the accuracy of resolvers or RVDT's.

Thus, it is apparent there is a need for a new rotary shaft sensor that is economical to manufacture, can be compactly packaged, can measure the shaft angle of rotation to a high degree of accuracy, and is readily adaptable to a wide range of input angles.

SUMMARY OF THE INVENTION

The primary aim of the present invention is to provide a contactless shaft angular position sensing system with greatly improved accuracy for a wide range of input rotational angles.

Another aim of this invention to achieve the foregoing in a sensor adapted to provide an output indicative of shaft angular position and rotation in binary digital format.

Yet another aim of this invention to provide an angular position sensor that is of robust construction, and can work in a wide variety of environments, with only a DC power source.

Still another aim of the invention is to provide the foregoing sensor in a compact package utilizing standard configuration components.

Another important object of the invention is to provide a sensor that can be easily reconfigured to accurately sense shaft angular position and rotation over a widely varying range of input shaft rotation angles.

These and other objectives and advantages of the invention will become apparent from the following detailed description when taken in conjunction with the accompanying drawings.

An angular position sensor in accordance with the invention includes a rotatable input shaft, or other rotatable input element, an annular two-pole input magnet connected for rotation proportionally responsive to rotation of an input shaft, a precision, motion-transmitting gear train provided with an input coupled for rotation with the input magnet, and an annular two-pole output magnet connected for rotation with the output of the gear train. An optional second gear train connected between the input shaft and the input magnet provides scaling of input shaft rotation when it is desired to accurately measure either fractional turns (small angular rotations much less than 360 degrees) or a large number of turns of the input shaft. The gear ratios of the gear trains are selected such that one of the magnets rotate a maximum of 360 degrees (the single-turn magnet) for the maximum angular rotation of the input shaft, and the other magnet rotates through multiple revolutions (the multiple-turn magnet) for the maximum one revolution of the single-turn magnet. Magnetic field sensor blocks sense the rotating magnet field of each magnet, and provide differential voltage signals indicative of the angular position of each magnet over a full 360 degrees of rotation. A preferred sensor block includes either a pair of angularly spaced ratiometric Hall-effect sensors that provide periodic phase-shifted output signals from which the angular position of the magnets can be determined, or a pair of magnetoresistive sensors that directly provide differential voltage signals for determination of the angular position of the magnets. In determination of the angular rotation of the input shaft, the single-turn magnet provides an absolute or coarse indication of input shaft rotation with a typical accuracy on the order of 2%, and is used to predict the angular position of the multi-turn magnet. The predicted and actual sensed angular position data is further processed to provide a highly accurate indication of the angular position and total rotation of the input shaft, with an improvement in accuracy directly proportional to the gear ratio between the magnets. For example, with a 20-to-1 gear ratio, input shaft rotation can be accurately measured to within 0.1% of its maximum angular rotation. Computation of the individual magnet rotation angles and the input shaft rotation is performed using a microprocessor and appropriate signal conditioning circuits.

An angular position sensor in accordance with the invention is generally provided in one of four basic embodiments: (1) a sensor for use with input shaft rotation up to a maximum of 360 degrees, (2) a sensor for use with input shaft rotation through multiple turns, but not greater than the ratio of the gear train between the two magnets, (3) a sensor for use with input shaft rotations through multiple turns greater than the ratio of the gear train between the magnets, and (4) a sensor for use with input shaft rotation through a fractional turn of substantially less than 360 degrees.

In a basic, first preferred embodiment, for use with a single rotation input shaft, the gear train is configured with a step-up gear ratio selected to achieve the overall desired sensor accuracy (discussed further below), the single turn magnet and input of the gear train are coupled directly to the input shaft, and the multi-turn magnet is coupled to the output of the gear train such that the input magnet turns up to one revolution with the input shaft, and the multi-turn magnet rotates several revolutions with the maximum one revolution of the input shaft. The single turn magnet is used to generate signals to calculate a coarse indication of input shaft angle. Current state-of-the-art in standard magnets and solid-state magnetic flux sensors can provide an indication of shaft angle within +4 degrees over 360 degrees of rotation and −40 to 125 degrees C. of temperature variation without special magnetization procedures, sensor configurations, or electronic temperature compensation. Since the angular rotation of the multi-turn magnet can be sensed with the same degree of accuracy, and its rotational angle is a fixed multiple (by the gear ratio) of the rotation of the single-turn magnet, it can provide a fine indication of input shaft angle with an approximate improvement in accuracy proportional to the interconnecting gear ratio. The calculated position of the coarse (single-turn) magnet is utilized to provide an absolute measure of shaft angle at all input rotational angles and to predict the angle of the fine (multi-turn) magnet as calculated by multiplying the sensed angle of the coarse magnet by the gear ratio. The difference in the calculated angles of the two magnets is divided by the inter-magnet gear ratio to provide a correction factor. Alternatively, the angle of the coarse magnet is utilized to count the number of complete turns of the multi-turn magnet and is added to the sensed angle of the multi-turn magnet. The total is divided by the gear ratio to provide an accurate measure of input angle. The interconnecting gear ratio must be less than 360 degrees divided by the coarse magnet position sensing error in degrees to accurately predict the number of revolutions the multi-turn magnet has traversed. As will be understood, the resolution accuracy of the detected shaft angle decreases as the total rotation of the coarse magnet decreases. Therefore, although the coarse magnet may be configured for rotation of less than 360 degrees, the approximately 360 degrees of rotation of the coarse magnet is preferred as providing maximum resolution accuracy for the coarse measure of the shaft angle.

In this first basic (single input revolution) embodiment, an annular magnet is fixed to or around the input shaft as the single-turn magnet. The magnet, preferably ALNICO or samarium cobalt for thermal stability, is magnetized to have two poles 180 degrees apart on its radial surface or end face to provide a periodically varying magnetic field as the magnet rotates. The magnetic field is sensed by two Hall-effect devices or magnetoresistive sensors placed at right angles to each other to sense the magnetic field variation as the magnet rotates. The input shaft is connected to the second, similar magnet and associated magnetic field sensor set through the step-up gear train to cause the second magnet to rotate several times as the input shaft is turned through one revolution. This multi-turn magnet is also annular in shape, and is fixed directly to or around an output shaft of the gear train. In the preferred embodiment, the gear train is a precision, two-step spur gear train with an overall ratio of 20 to 1 or another appropriate integer value that is evenly divisible into 360 degrees to simplify computations. The analog voltage signals from the magnetic field sensors are converted to digital format and utilized by a microprocessor to calculate individual magnet rotational angles, to calculate the precise angle of the input shaft, and to provide the calculated input shaft angle in either digital or analog electronic format.

In a second preferred embodiment, rotational angle of multiple input shaft revolutions, up to the ratio of the interconnecting gear train, is measured by connecting the input shaft to the multi-turn magnet and utilizing the interconnecting gear train as a gear reducer to produce no more than one turn of the coarse, or absolute, magnet connected to the output shaft of the gear train. In this instance, the angle of the coarse magnet is used as an indication of the absolute number of turns of the input shaft and to predict the angle of the multi-turn magnet, and the angular measurement of the multi-turn magnet is used to refine the rotational angle of the input shaft.

In a third preferred embodiment, a second gear reducer is added between the input shaft and the multi-turn, or fine magnet of the second embodiment noted above, for sensing of shaft revolutions greater than the ratio of the gear train between the magnets.

In a fourth preferred embodiment, a second gear increaser is added to the first basic, single-turn embodiment discussed above to enhance the accuracy of sensing fractional rotations of the input shaft.

BRIEF DESCRIPTION OF THE DRAWINGS

FIG. 2 is a table of typical input and sensor-connecting gear ratios suitable to implement a precision sensor for fractional to multi-turn applications.

Figure 1:
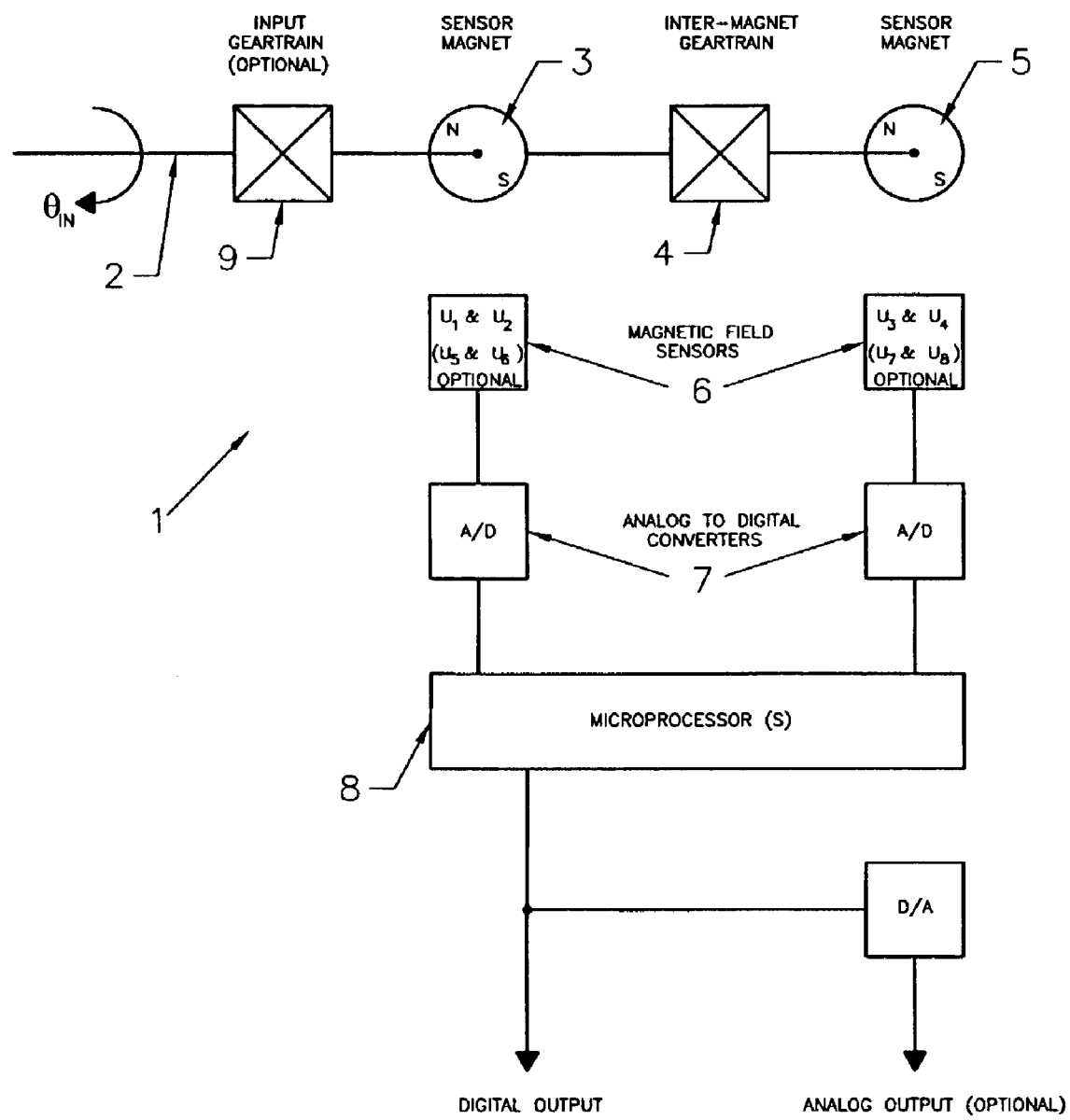
FIG. 1 is a block diagram of the overall invention, showing two angular position sensing assemblies connected to each other and to the input shaft by appropriate gear trains.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a block diagram representation of a shaft angle position sensor 1 in accordance with the present invention. The sensor includes a rotary input shaft 2 mounted for rotation through an angle designated as $\theta_{IN}$, an input sensor magnet 3 connected for rotation responsive to rotation of the input shaft, an inter-magnet (interconnecting) gear train 4 having an input connected for rotation with the input sensor magnet 3, a second (output) sensor magnet 5 connected for rotation with the output of the gear train 4, magnetic field sensors 6 positioned proximate the magnets to sense associated magnetic fields as they rotate, analog to digital converters 7 to convert the output signals from the magnetic field sensors, microprocessor(s) 8 to determine the angular positions of the sensor magnets and the rotational angle of the input shaft from the digital signals, and an optional input gear train 9 to provide for increased range of sensed input shaft rotational angles. The input magnet 3 is either coupled directly to the input shaft for rotation therewith, or is coupled to the input shaft through the optional input gear train 9. The gear ratios of the gear trains 4, 9 are selected cooperatively such that one of the magnets 3 or 5 (the single-turn magnet) turns no more than one revolution as the input shaft turns over its maximum range of rotation. This magnet is utilized as an absolute reference in determining the rotational angle of the input shaft. The inter-magnet gear train 4 is further configured to rotate the other magnet (the multi-turn magnet) through several rotations for the one rotation of the single-turn magnet. The rotation of the multi-turn magnet is utilized as a fine or precision indication of the angular position of the input shaft 2. The sensor magnets are provided with two poles 180 degrees apart to establish a periodic variation in the surrounding magnetic field as they rotate on their respective axes. The rotating magnetic fields are each sensed by a pair of magnetic field sensors 6 associated with each magnet. The magnetic field sensors are located 90 degrees from each other around the axes of rotation of the magnets such that the magnetic field sensors sense orthogonal components of the rotating magnetic fields. An optional second pair of magnetic field sensors 6 can be located around each magnet for redundancy and improve overall reliability of the sensor 1. The output voltages from the magnetic field sensors are converted to digital format by electronic analog to digital converters 7. These digital signals are utilized by the microprocessor 8 to calculate the angle of rotation of each magnet, to compute a precise measurement of the rotational angle of the input shaft 2 from the calculated angles of rotation of the magnets, and to provide an output signal indicative of the computed rotational angle of the input shaft in either digital or analog electronic output format. The optional input gear train 9 is utilized to enable accurate sensing and indication of the rotational angle of the input shaft for either a large number of turns or fractional rotation of the shaft.

FIG. 2 presents a chart of typical ratios for the input gear train 9 and the inter-magnet gear train 4, for four different ranges of rotation ($\theta_{IN}$) of the input shaft 2 and associated turns of the input magnet 3. The turns of the output magnet 5 are not shown in FIG. 2, but are equal to the number of turns of the input magnet multiplied by the gear ratio of the interconnecting gear train 4. Line 1 of this chart presents a basic embodiment configured to sense a single rotation of the input shaft 2. No input gear train 9 is required, and the input magnet 3 is connected directly to the input shaft as the single-turn magnet, to provide the coarse or absolute indication of the angular position of the input shaft as it rotates between 0 and 360 degrees. The inter-magnet gear train 4 provides a step-up ratio of 20 to cause sensor magnet 5 to rotate 20 times for one revolution of the input magnet. Line 2 of the chart shows a gear train configuration for sensing multiple turns of the input shaft. Again no input gear train 9 is required, and the input magnet 3 is connected directly to the input shaft. In this instance, the input magnet may be turned up to 20 revolutions with the input shaft, and the inter-magnet gear train 4 provides a step-down ratio of 20 to cause the sensor magnet 5 to rotate no more than one revolution for the maximum 20 turns of the input shaft. The third line of FIG. 2 shows a gear train configuration to sense a larger number of revolutions of the input shaft, and specifically when the number of turns of the input shaft is greater than the step-down ratio of the inter-magnet gear train. This is accomplished by the addition of the input gear train 9 connected between the input shaft and the input magnet 3, shown with a step-down ratio of 24 to sense up to 480 turns of the input shaft. Line 4 of FIG. 2 presents a gear train configuration to accurately sense a fraction of a revolution of the input shaft 2, and specifically to sense a maximum rotational angle that is less than the inverse of the step-up ratio of the inter-magnet gear train. In this case, an additional step-up ratio is provided in the input gear train. With an input step-up ratio of 12 as shown, and the rest of the configuration as presented in Line 1, the resulting sensor is capability of accurately sensing rotational angles of the input shaft from 0 to 30 degrees (1/12 of a full turn).

Figure 3:
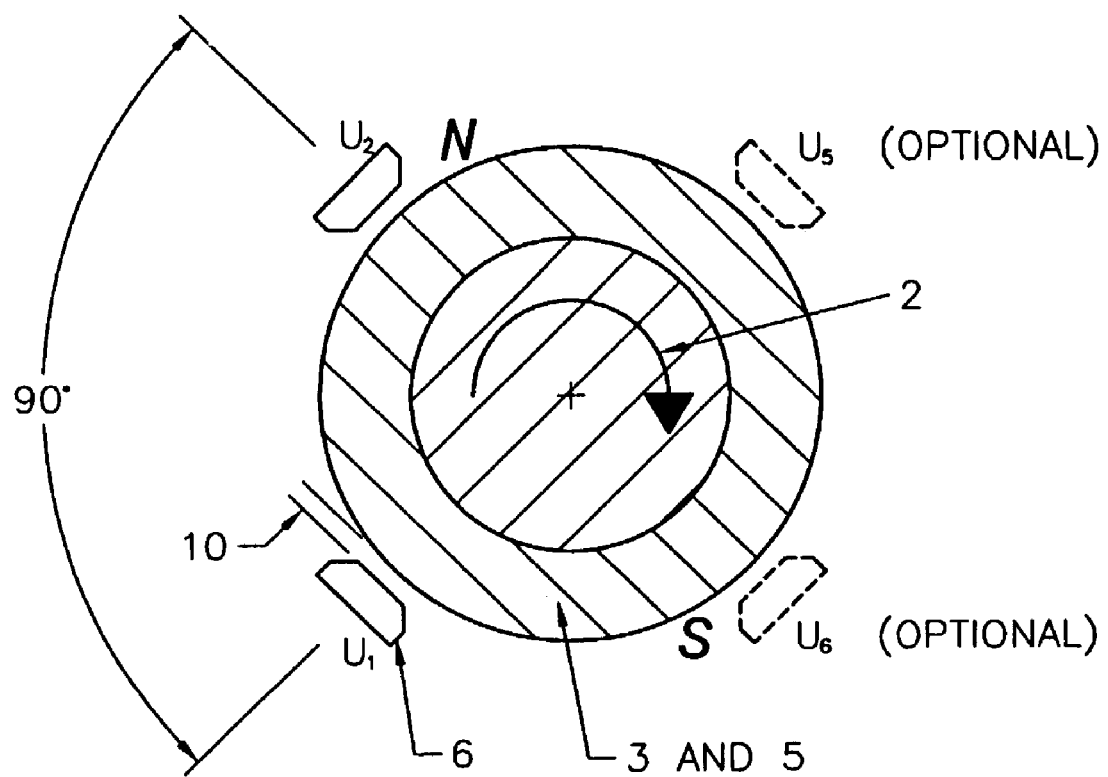
FIG. 3 is a fragmentary cross-section view of an angular position sensing assembly which includes a rotating input shaft and annular magnet, and two ratiometric Hall-effect sensors.

FIG. 3 presents a preferred embodiment of the sensor magnets 3 and 5 and the associated magnetic field sensors 6 as viewed perpendicular to the axis of rotation of the input shaft 2 and magnets. The preferred magnet configuration is circular in outer profile cross-sectional, and otherwise shaped with two radial poles indicated as "N" and "S" 180 degrees apart to establish an approximately sinusoidally varying magnetic field at a specified distance from the magnet as it rotates. A magnet material which has low sensitivity to temperature, such as ALNICO or samarium cobalt, provides good stability of magnetic field strength. The preferred magnets are further configured as annular magnets, with a center through hole to allow the input shaft and output gear shaft to extend through the magnets for ease of attachment and compact packaging. Although not a requirement of this invention, selection of the ratio of magnet outside to inside diameter and magnetizing as described in Frederick, et al, U.S. patent application Ser. No. 10/087,322 filed Feb. 28, 2002, and corresponding to U.S. Provisional Patent Application Ser. No. 60/272,200 filed Feb. 28, 2001, will provide additional improvements in overall accuracy of the sensor. The preferred magnetic field sensor type is a pair of ratiometric Hall-effect devices, indicated as $U_1$ and $U_2$ associated with magnet 3 (and $U_3$ and $U_4$ associated with magnet 5) located 90 degrees from each other around the outside diameter of the magnets. Alternately, the magnetic field sensors associated with each magnet may be magnetoresistive bridge sensors having magnetically sensitive axes at right angles to each other. The space 10 between the magnetic field sensitive area of the sensors and the outside diameter of the magnets is established to prevent saturation of the sensors when they are subjected to the maximum magnetic field strength created by the near presence of a magnetic pole. Advantageously, this magnet and sensor configuration allows room for an optional second set of sensors $U_5$ and $U_6$ associated with sensor magnet 3, and sensor set $U_7$ and $U_8$ associated with magnet 5, when desired for redundancy and improved reliability, and interfacing with a redundant set of computational circuitry 7 and 8.

Figure 4:
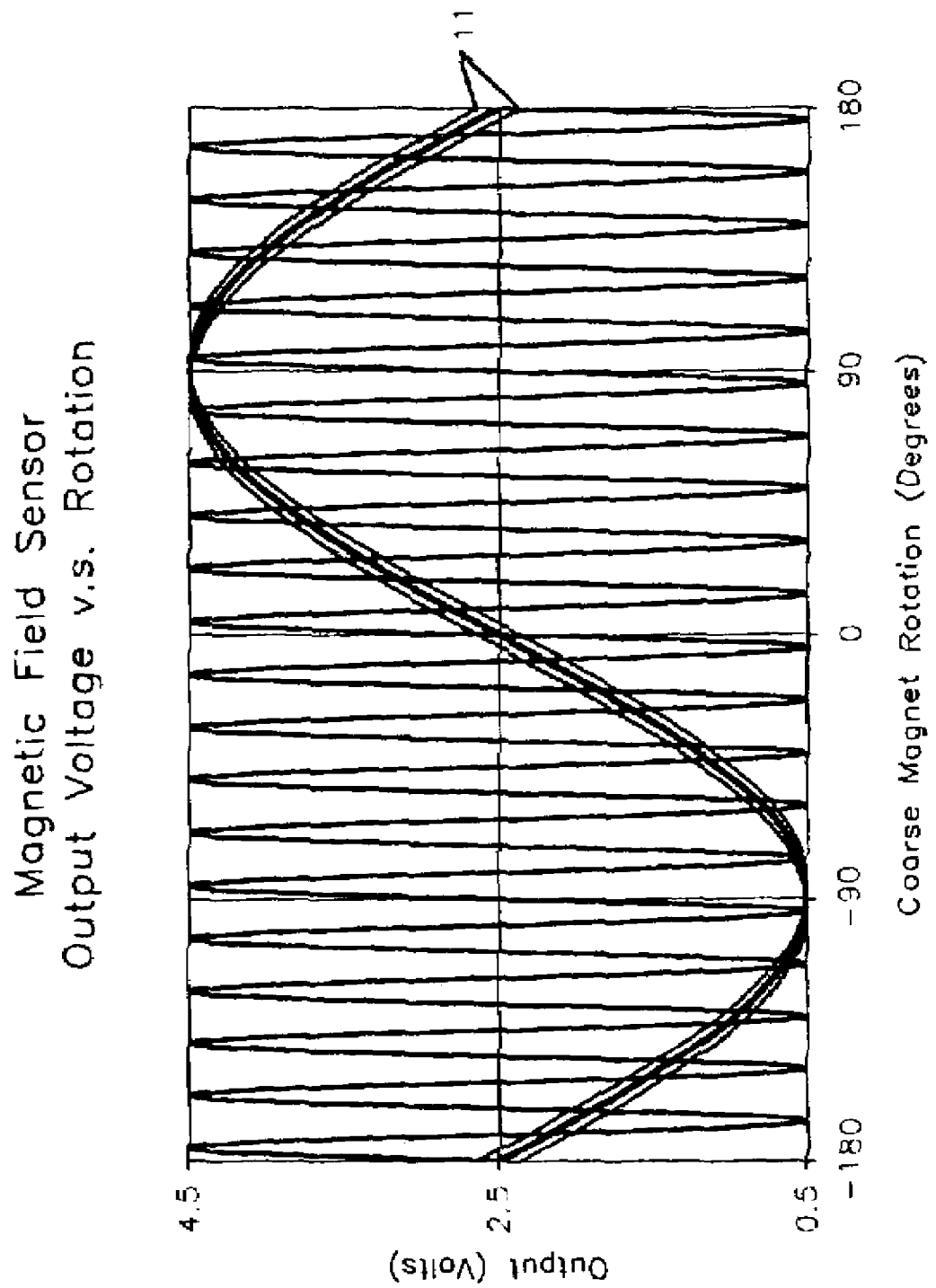
FIG. 4 is a graphical representation of output voltages from individual magnetic field sensors associated with rotating magnet assemblies interconnected by a gear train, versus degrees of coarse magnet rotation.

FIG. 4 presents a plot of typical output voltages from a single Hall-effect device U1 located in a nonsaturating field around sensor magnet 3, and a single Hall-effect device located in a nonsaturating field of the same maximum strength around sensor magnet 5, when the coarse magnet rotates through one revolution and is connected to the fine magnet through a 20 times gear ratio. Output voltage versus rotation for the other Hall-effect device associated with each magnet will be similar but shifted 90 degrees in phase. As shown in FIG. 4, worst case sensing error 11 as a function of operating temperature effects on the magnets and magnetic field sensors and residual mechanical zero shift between the coarse and fine magnets is less than ±4 degrees, and is typically on the order of ±2 degrees. In determining the rotational angle of the input shaft 2, the single-turn magnet is used to provide an absolute reference and its sensed output can be used to predict the number of turns traversed by the fine magnet with an uncertainty in degrees equal to its worst case error multiplied by the ratio of the interconnecting gear train. With a gear ratio of 20, this results in:

±4 degree×20=±80 degrees of uncertainty.

Since this uncertainty is less that 360 degrees, the exact number of revolutions that the fine magnet has rotated is known to the sensed accuracy of the fine magnet, resulting in an accuracy improvement proportional to the ratio of the interconnecting gear train. For a 20:1 interconnecting gear train, accuracy equals:

±4 degrees/20±0.2 degrees over 360 degrees of rotation of the input shaft.

Addition of a third rotating sensor magnet and second interconnecting gear train could reduce error even further, such as with a gear ratio of 20 to as low as (±0.2/20=)±0.01 degrees, which is within typical manufacturing accuracy of the gear trains themselves.

Figure 5:
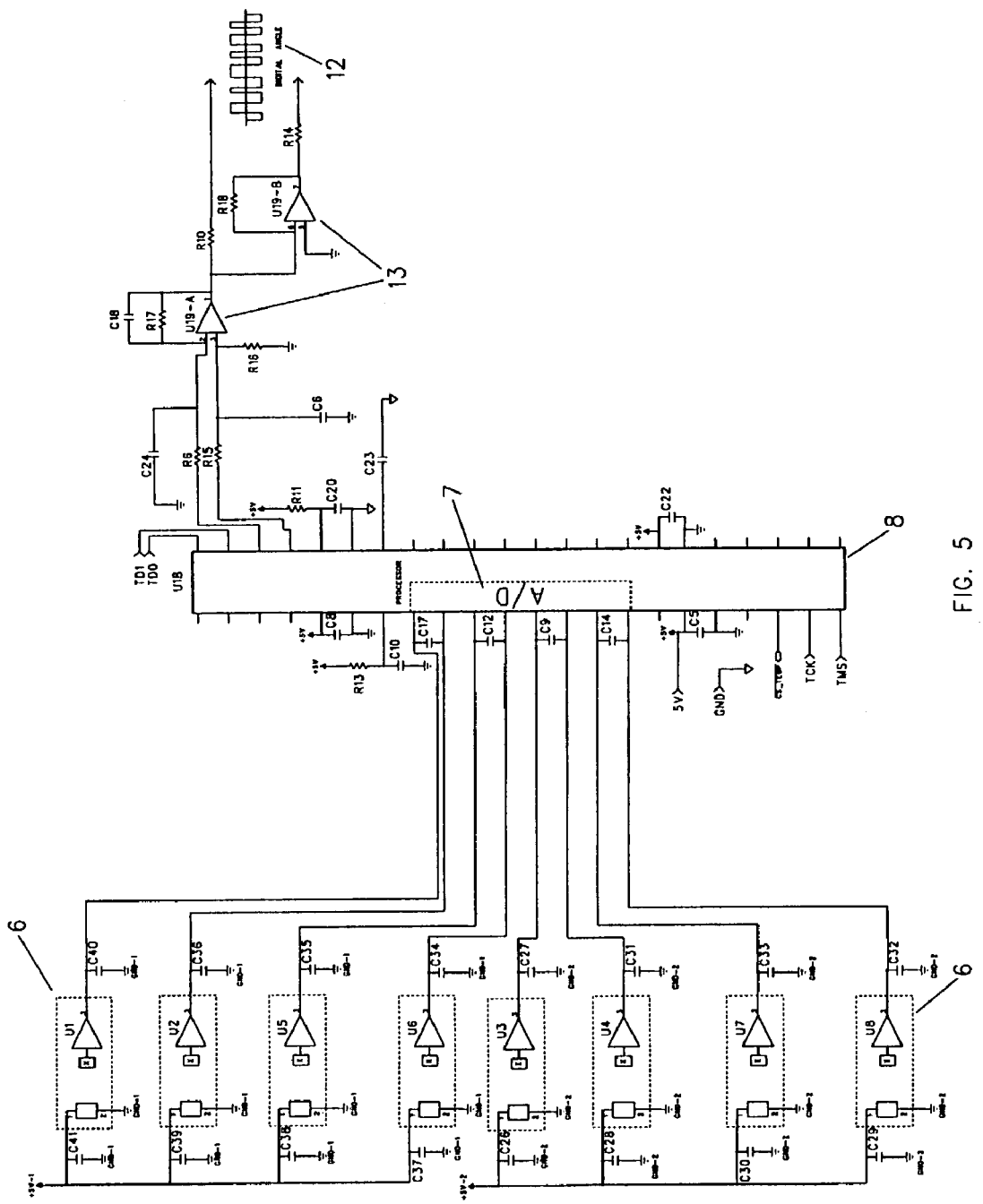
FIG. 5 is a schematic diagram of a sensing and computational circuit suitable to produce an accurate, digital electronic representation of the input shaft rotation angle.

FIG. 5 presents a schematic of a simple microprocessor-based electronic circuit suitable to convert the output signals from the magnetic field sensors 6 to a digital signals, to calculate the angular positions of associated sensor magnets, to compute the rotational angle of the input shaft, and to provide an output signal that is indicative of the input rotational angle in serial digital format. The ratiometric Hall-effect sensors, such as Allegro 3518 or equivalent, provide an output which is proportional to the applied magnetic field over a ±800 Gauss range and have a quiescent, or 0 Gauss, output of 2.5 volts with a 5.0 volt DC supply as shown. These magnetic field sensors are designated $U_1$ through $U_8$ in FIG. 5. Their output voltages vary periodically as the sensor magnets rotate and expose them to a varying magnetic field such as shown in FIG. 4. These signals are converted to digital signals by analog to digital converters 7 prior to use in computations by the microprocessor 8. The microprocessor chosen and illustrated in FIG. 5 is an Atmel AT mega 323, selected for its inclusion of 8 on-board, 10-bit analog-to-digital converters, compact size, low power consumption, and serial data interface. The microprocessor calculates the angular position of each magnet by first subtracting out the equivalent quiescent voltage from each of the converted sensors output voltages. The arctangent of the ratio of the signals from the 90 degree-out-of-phase pair of magnetic field sensors associated with each magnet is calculated and is equivalent to the angular position, between 0 and 360 degrees, of the associated magnet. The calculated angle of the coarse (single-turn) magnet multiplied by the inter-magnet gear ratio gives an approximate calculation of the total number of turns or degrees of rotation of the fine (multi-turn) magnet. The measured number of degrees of rotation of the fine magnet is used to provide a more accurate indication of its angle of rotation. The total number of degrees of rotation of the fine, multi-turn magnet is then divided by the total gear ratio to the input shaft to provide a calculated value of input shaft rotation with an accuracy typically better than 0.1%. This computed angle is provided as a 12-bit serial digital output signal 12 that varies linearly and proportionally to the rotational angle of the input shaft. Output amplifiers 13 provide the appropriate rise times, pulse amplitude, and output impedance for a bus interface. An analog output signal (not shown) may also be provided with a conventional conditioning circuit communicating with the microprocessor. The remainder of the components shown in the schematic (e.g., capacitors, resistors, grounds, etc.) are generally presented with conventional graphic representations and alphanumeric indicia.

As a numerical example, for the embodiment indicated in the first data line of FIG. 2, and discussed otherwise above, having an input shaft that rotates through a maximum of 360 degrees, a step-up gear ratio between the sensor magnets of 20, and angular position sensing accuracy of ±4 degrees. The input magnet is the single-turn magnet, and the output magnet is the multi-turn magnet. Suppose, at one data point, the angular position of the coarse magnet is computed at 165±4 degrees, and the angular position of the fine magnet is computed at 61.5±4 degrees. The computed angle of coarse magnet translates to estimated 165 (±4)×20=3,300 (±80) degrees of total angular rotation of the fine magnet, which corresponds to between (3,220/360=) 8.9 turns to (3,380/60=)9.4 turns of the fine magnet. This apparent ambiguity in the estimated number of full turns of the fine magnet is resolved to 9 full turns by virtue of the angular position of the fine magnet having been calculated at 61.5±4 degrees. With this data, the total angular rotation of the fine magnet is calculated at 9×360+61.5(±4)=3,301.5 (±4) degrees, and the angular rotation of the input shaft is accurately computed at (3,301.5±4)/20=165.075±0.2 degrees.

Figure 6:
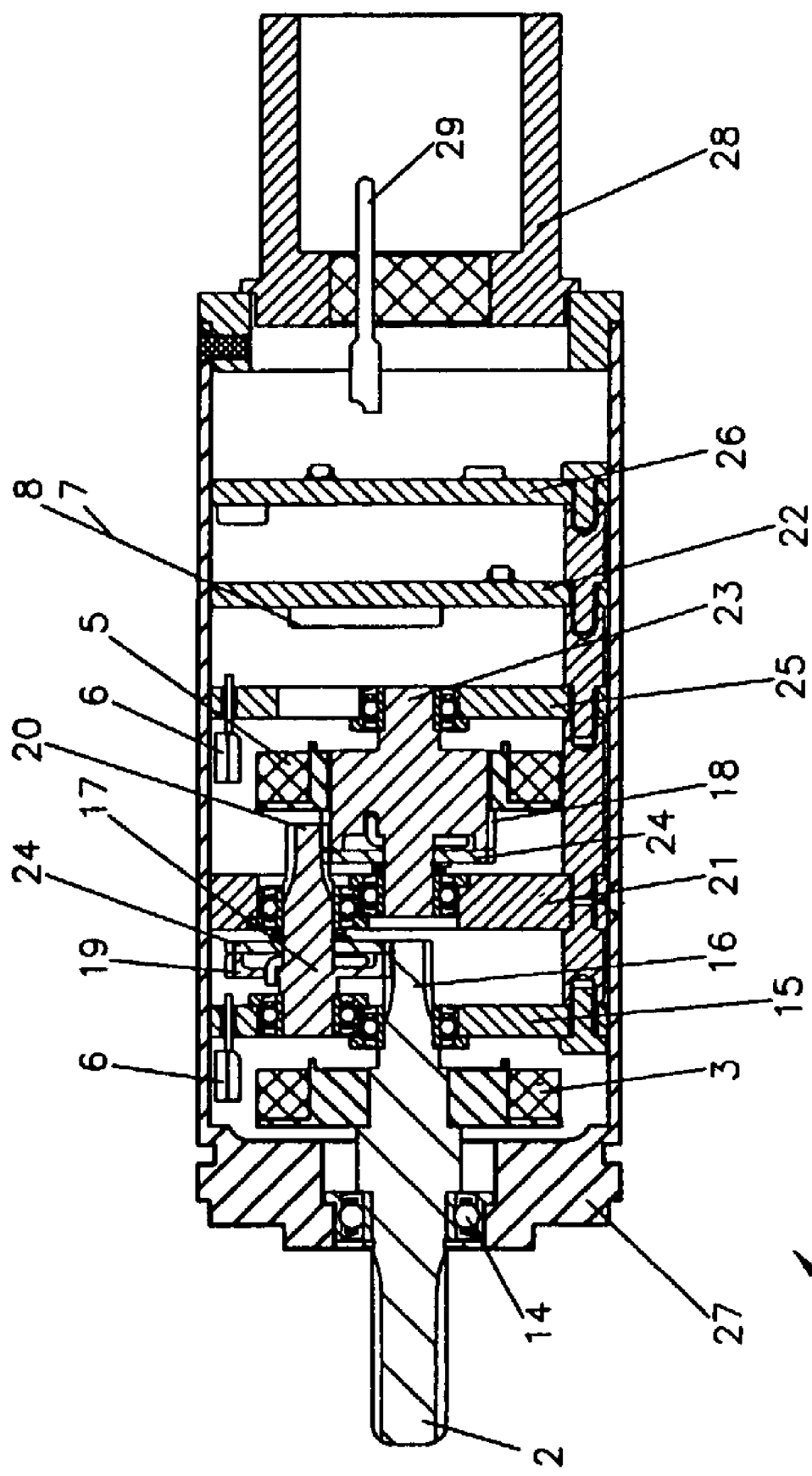
FIG. 6 is a longitudinal cross-sectional view of an angular position sensor configured to sense angular rotation over 20 turns of the input shaft.

FIG. 6 shows a preferred embodiment of the sensor 1 configured to sense angular rotation of the input shaft 2 through multiple turns, such as for up to 20 revolutions discussed above. The input shaft shown is provided with an external spline at its free end for coupling to an external rotary device. The multi-turn annular input sensor magnet 3 is attached around and for rotation with the input shaft 2 which is supported on bearings 14. The Hall-effect sensors 6 associated with the input magnet are attached to sensor printed circuit board 15. The inter-magnet gear train 4 includes an input pinion 16 machined directly onto the input shaft 2, a cluster gear 17, and an output gear 18. The cluster gear includes gear 19 and an output spur gear 20 which drives the output gear 18. The cluster gear 17 rotates on bearings 14 which are mounted in printed circuit board 15 and mounting plate 21. The single-turn annular sensor magnet 5 is attached concentric to a shaft 23 on which the output gear 18 is machined. The output gear 18 and cluster gear 17 include anti-backlash gears 24 to eliminate hysteresis in the gear train, and in the sensed angular position signals. The Hall-effect sensors 6 associated with the single-turn magnet 5 are mounted on a second printed circuit board 25. The output gear 18, single-turn magnet 5, and shaft 23 rotate on bearings 14 which are mounted in plate 21 and printed circuit board 25. The result is a compact magnet, sensor, and gear train package which allows the input shaft 2 and output shaft 23 to share a common axis of rotation. The microprocessor 8 and integral analog to digital converters 7 are mounted to a third printed circuit board 22. A fourth printed circuit board 26 includes a power supply to regulate the DC input power to the levels needed by the sensors 6 and microprocessor 8. All of these elements of the sensor 1 are mounted in a machined steel housing 27 which provides protection from moisture and contamination, and which shields against external magnetic fields affecting the non-saturating magnetic fields of the magnets in which the magnetic field sensors operate. An output connector 28 is attached to the housing 27 and provides for sealed electrical contacts 29 of all electrical signal and power interfaces. With this configuration, and such as when provided to sense up to 20 turns of the input shaft, the sensor elements allow for an overall sensor package that is only 1.1 inches in diameter and less than four inches long. Adding redundant magnetic field sensors, a second microprocessor, and a second independent power supply allows for a second, electrically-independent, redundant sensor output with an addition in length of only one inch.

Reconfiguring the embodiment shown in FIG. 6, to utilize the input magnet 3 as the single-turn magnet, the output magnet 5 as the multi-turn magnet, and modifying the inter-magnet gear train 4 to be a two-stage, step-up gear train such as with the same ratio of 20 allows this same unit package to perform as an accurate sensor for a single turn of the input shaft 2.

Figure 7:
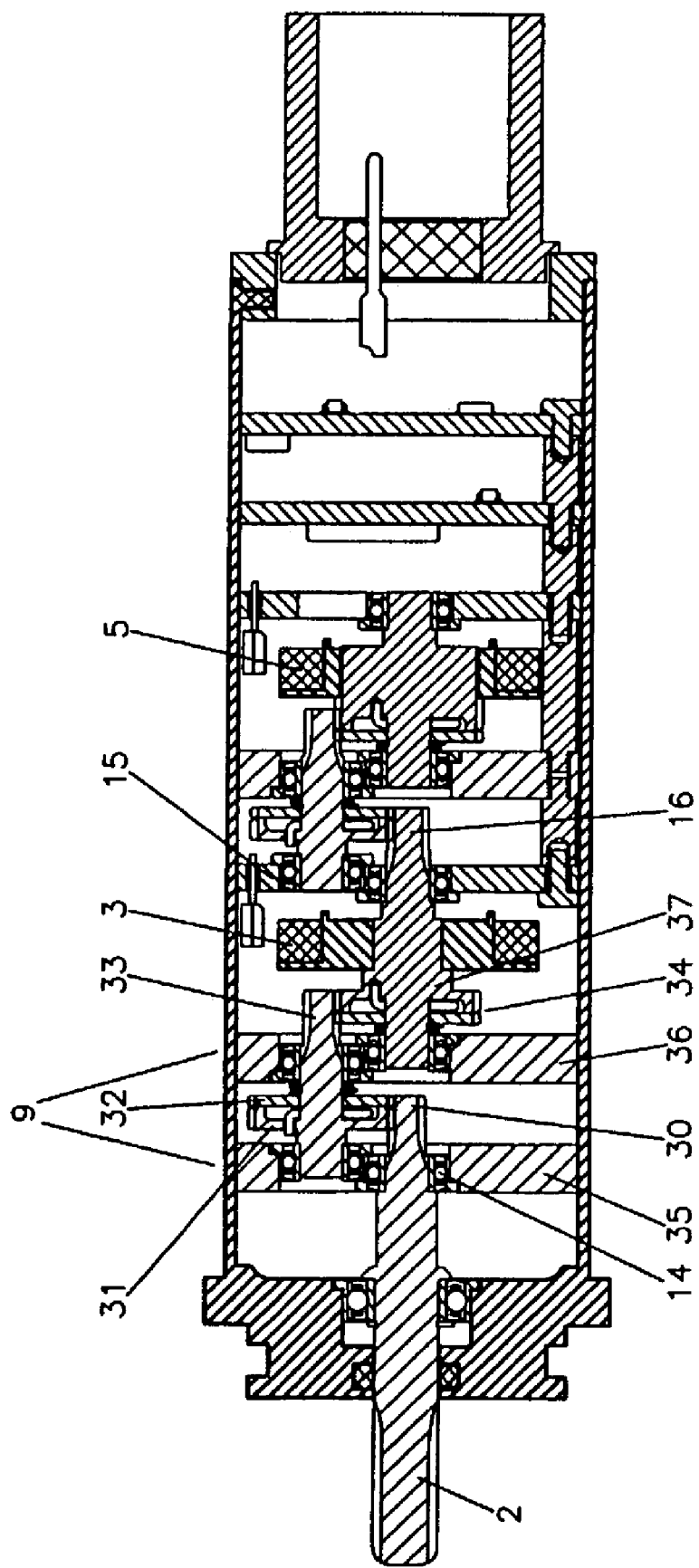
FIG. 7 is a longitudinal cross-sectional view of an angular position sensor similar to the sensor of FIG. 6 but additionally configured to sense angular rotation over 480 turns of the input shaft.

FIG. 7 shows an angular position sensor 1A with the same preferred embodiment as in FIG. 6, but with the addition of an input gear train 9 to provide the ability to a sense larger number of turns of the input shaft 2. With, for example, the input gear train configured with an additional 24 times step-down gear ratio, the sensor 1A is capable of sensing up to 480 turns of the input shaft, typical of the range needed to sense the turns of a linear screw mechanism in an aircraft flight surface actuator. The input gear train includes an input spur gear 30 machined onto the input shaft, a cluster gear 31 which includes an anti-backlash gear 32 and output pinion 33, and an anti-backlash magnet drive gear 34. The cluster gear 31 rotates on bearings 14 which are mounted in plates 35 and 36. The magnet drive gear 34 and input magnet 3 are mounted on a common concentric shaft 37 which also includes the spur gear 16. Shaft 37 rotates on bearings mounted in plate 36 and printed circuit board 15. This compact input gear train adds less than one inch to the length of the sensor configuration shown in FIG. 6.

Reversing the input gear train 9 of sensor 1A to provide a step-up ratio, utilizing the input magnet 3 as a single-turn magnet, the second magnet 5 as the multi-turn magnet, and reversing the inter-magnet gear train 4 to also provide a step-up ratio allows the same package to accurately sense input shaft rotation over a total angular range of less than 15 degrees.

From the foregoing, it will be apparent that the present invention brings to the art a new and improved contactless sensor that, among other things, is capable of accurately sensing rotational angle of a rotatable shaft, and supplying a digital output signal that is linearly proportional to the sensed angle of rotational. The preferred sensor configuration are economical to manufacture, utilizing standard configuration types of elements, and are of compact and robust construction, not susceptible to contamination or other common error producing or life-limiting factors of many prior angular position sensors. Moreover, the sensor of the present invention is easily adaptable for use over a wide range of rotational input angles.

We claim:

1. A contactless angular position sensor comprising:
   a rotatable shaft,
   a first magnet connected for rotation responsive to rotation of the shaft, the first magnet establishing a first continuously varying magnetic field as the shaft rotates;
   a first gear train having an input connected for rotation with the first magnet and an output responsive to rotation of the input according to a first rotational ratio therebetween;
   a second magnet connected for rotation with the output of said gear train, the second magnet establishing a second continuously varying magnetic field as the output of the gear train rotates;
   first and second magnetic field sensors positioned to sense the first and second continuously varying magnetic fields, respectively, of said magnets as they rotate, said magnetic field sensors having respective output signals indicative of the magnetic fields sensed; one of said output signals being course indicative of the angular position of the shaft and the other of said output signals being fine indicative of the angular position of the shaft; and
   a signal processing block receiving said output signals and operative to determine an indication of the angular position of said magnets therefrom, and to provide a resultant signal indicative of the rotational angle of the shaft as a function of the rotational ratio of the gear train and the angular positions of the magnets.

2. The position sensor as defined in claim 1 in which said magnets are each provided with two poles that rotate about the rotational axes of the magnets to establish a periodic variation in field intensity sensed by said magnetic field sensors.

3. The position sensor as defined in claim 2 in which the input and output of said gear train comprise input and output shaft elements, respectively, said magnets are annular in cross-section perpendicular to associated rotational axes, said first magnet is fixed around one of said shaft and said input shaft element, and said second magnet is fixed around the output shaft element of the gear train.

4. The position sensor as defined in claim 3 in which the magnets are annular in shape, having on outer radial surface and opposing sides, and the two poles of each magnet are provided at 180 degrees apart on at least one of (i) the outer radial surface and (ii) one of said opposing sides to establish a generally sinusoidal variation in magnetic field intensity sensed by said magnetic field sensors as the magnets rotates.

5. The position sensor as defined in claim 2 in which the magnetic field sensors each comprise two ratiometric Hall-effect devices (i) associated with each of the magnets, and (ii) located 90 degrees from each other around the rotational axes of the magnets.

6. The position sensor as defined in claim 5 in which the magnetic field sensors each comprise two additional ratiometric Hall-effect devices (i) associated with each of the magnets, and (ii) located at 90 degree from each other around the rotational axes of the magnets.

7. The position sensor as defined in claim 2 in which the magnetic field sensors each comprise magnetoresistive bridge sensors (i) associated with each of the magnets, (ii) having magnetically sensitive axes at right angles to each other, and (iii) positioned in non-saturating magnetic fields of the associated magnets.

8. The position sensor as defined in claim 1 in which the rotational ratio of the gear train is an integer evenly divisible into 360.

9. The position sensor as defined in claim 1 in which the shaft is rotatable over a maximum rotational angle, one of the magnets is a single-turn magnet connected for maximum rotation of 360 degrees associated with the maximum rotational angle of the shaft, and the other of the magnets is a multi-turn magnet connected for minimum operative rotation of multiple turns associated with the maximum 360 degree rotation of the single-turn magnet.

10. The position sensor as defined in claim 9 in which the rotational ratio of the gear train is less than the inverse of the accuracy in parts per hundred for which the rotational angle of the single-turn magnet can be sensed by said magnetic field sensors.

11. The position sensor as defined in claim 10 in which the single-turn magnet is connected for rotation with the shaft for sensing fractional turns to one complete turn of the shaft.

12. The position sensor as defined in claim 9 in which the multi-turn magnet is connected for rotation with the shaft for sensing turns of the shaft greater than one and less than the rotational ratio of the gear train, and in which the gear train comprises a step-down gear train having a rotational ratio of less than the inverse of the accuracy in parts per hundred for which the rotational angle of the single-turn magnet can be sensed.

13. The position sensor as defined in claim 9 in which the angular position of the single-turn magnet is computed by the signal processing block, and is multiplied by the rotational ratio of the gear train to estimate the angular position of the multi-turn magnet.

14. The position sensor as defined in claim 13 in which the angular position of the multi-turn magnet is computed by the signal processing block, and is compared to the estimated angular position thereof and an error correction angle calculated to increase overall sensed accuracy by the rotational ratio of the gear train.

15. The position sensor as defined in claim 14 in which the signal processing block includes a microprocessor receiving said output signals and operative to compute the angular positions of the magnets and the error correction therefrom, and to provide the resultant signal in digital format.

16. The position sensor as defined in claim 1 further comprising a second gear train having input and output rotational elements with a second rotational ratio therebetween and connected between the shaft and the first magnet, respectively.

17. The position sensor as defined in claim 1 in which the gear train comprises a two-pass, spur gear train, and the input and output associated therewith have the same axis of rotation.

18. The position sensor as defined in claim 16 in which said gear trains comprise two-pass, spur gear trains, and input and output associated with said gear trains have the same axis of rotation.

19. A contactless angular position sensor comprising:
a shaft rotatable through a first rotational angle;
a gear train having an input connected for rotation responsive to rotation of the shaft and an output responsive to rotation of the input according to a rotational ratio therebetween;
a single-turn annular magnet connected for rotation with one of the input and the output of said gear train for maximum rotation of 360 degrees associated with rotation of the shaft through said first rotational angle;
a multi-turn annular magnet connected for rotation with the other of the input and the output of said gear train for multiple rotations degrees associated with said maximum rotation of the single-turn magnet;
the magnets each having two poles spaced 180 degrees apart to establish to establish a periodic variation in magnetic field intensity as the magnets rotate;
a pair of magnetic field sensors associated with each of the magnets, the magnetic field sensors being positioned to sense the periodic variation of the magnetic field as the magnets rotate and having output signals indicative of the magnetic fields sensed and phase-shifted 90 degrees from one another; and
a signal processing block receiving said output signals and operative to compute the angular position of said magnets therefrom, and to provide a resultant signal indicative of the rotational angle of the shaft as a function of the rotational ratio of the gear train and the computed angular positions of the magnets.

20. A contactless angular position sensor comprising:
a shaft rotatable through a fractional rotation of a turn;
a first, step-up gear train having an input element connected for rotation with the shaft and an output element connected for rotation responsive to rotation of said input element according to a rotational ratio therebetween of greater than one and less than or equal to 360 divided by the angle associated with said fractional rotation;
a first magnet connected for rotation with said output element for a maximum of one rotation associated with said fractional rotation of the shaft;
a second, step-up gear train having an input connected for rotation with said first magnet and an output connected for rotation responsive to rotation of said input according to a step-up rotational ratio therebetween whereby said output rotates through multiple revolutions for a single revolution of the first magnet,
a second magnet connected for rotation with the output of said second gear train;
first and second stationary magnetic field sensors positioned to measure the magnetic flux of the first and second magnets, respectively, as they rotate, said first and second sensors having respective output signals indicative of the magnetic fields sensed; and
a microprocessor-based circuit receiving said output signals and operative to compute the angular positions of the magnets therefrom and to provide a resultant signal indicative of the rotational angle of the shaft as a function of said rotational ratios and the computed angular positions of the magnets.

21. The position sensor as defined in claim 20 in which the output signals from said magnetic field sensors are proportional to the magnetic fields sensed.

22. The position sensor as defined in claim 20 in which the microprocessor-based circuit is operative to provide a resultant signal proportional to the rotational angle of the shaft.

23. The position sensor as defined in claim 20 in which said gear trains comprise two-pass, spur gear trains having common axes of rotation.

24. A contactless angular position sensor comprising:
a shaft rotatable through multiple turns to a maximum rotational angle;
a first, step-down gear train having a rotational input element connected for rotation with the shaft and a rotational output element operatively responsive to rotation of the input element according to a step-down rotational ratio therebetween;
a first magnet connected for rotation with the output element of said gear train;
a second, step-down gear train having an input connected for rotation with said first magnet and an output connected for rotation responsive to rotation of said input according to a step-down rotational ratio therebetween;
a second magnet connected for rotation with the output of the second gear train; relationship with rotation of the shaft;
the rotational ratios of the gear trains being further characterized as establishing a maximum of one rotation of the second magnet associated with the maximum rotational angle of the shaft;
first and second stationary magnetic field sensors positioned for measuring the magnetic flux of the first and second magnets, respectively, as they rotate, said first and second sensors having respective output signals indicative of the magnetic fields sensed; and
a microprocessor-based circuit receiving said output signals and operative to compute the angular positions of the magnets therefrom and to provide a resultant signal indicative of the rotational angle of the shaft as a function of the rotational ratios and the computed angles of the magnets.

25. The position sensor as defined in claim 24 in which the output signals from the magnetic field sensors are proportional to the magnetic fields sensed.

26. The position sensor as defined in claim 24 in which the microprocessor-based circuit is operative to provide a resultant signal proportional to the rotational angle of the shaft.

27. The position sensor as defined in claim 24 in which said gear trains comprise two-pass, spur gear trains having common same axes of rotation.

28. A method for sensing angular position comprising the steps of:
A) providing a shaft rotatable through a maximum rotational angle,
B) dividing an approximate maximum rotational angle associated with said maximum rotational angle of the shaft into multiple segments of equal angular rotation less than 360 degrees;
C) further providing a rotary signal generator having first and second rotating magnetic field elements responsive to rotation of the shaft and operative to provide a first periodic signal indicative of the angular position of the shaft through said approximate maximum angular rotation, and a second periodic signal indicative of the angular position of the shaft in each of said angular segments, respectively;
D) determining in which one of said angular segments the shaft is in from said first signal, and the angular position of the shaft in said one determined angular segment from said second signal; and E) establishing a resultant signal indicative of the rotational angle of the shaft as a function of the ratio between said approximate maximum rotational angle and said one angular segment, and the angular positions of the shaft from said determining step.

29. The method as defined in claim 28 in which said first and second rotating magnetic field elements comprise first and second pairs of 90 degree phase-shifted sinusoidal signals.

30. The method as defined in claim 28 in which said angular segments are equal to 360 degrees, and the ratio of the cycles of said second periodic signal to the cycles of said first periodic signal through said maximum angular rotation is greater than one.

31. The method as defined in claim 30 in which said ratio is an integer multiple of 360.

32. A method for sensing angular position comprising the steps of:
   A) providing a shaft rotatable through a maximum rotational angle,
   B) dividing the maximum rotational angle of the shaft into multiple segments of equal angular rotation;
   B) further providing a first sinusoidal signal indicative of the angular position of the shaft through said maximum rotational angle, and a second sinusoidal signal indicative of the angular position of the shaft in each of said segments of angular rotation;
   C. determining in which one of said angular segments shaft is in from said first signal, and the angular position of the shaft in said one angular segment portion from said second signal; and
   D. establishing a resultant signal indicative of the rotational angle of the shaft as a function of the ratio of said maximum rotation and said one angular segment, and the angular position of the shaft from said determining step.

33. The method as defined in claim 32 in which said angular segments are equal to 360 degrees, and the ratio between said maximum rotation and said one angular segment is greater than one.

34. The method as defined in item 32 in which said angular segments are less than 360 degrees, and the ratio between said maximum rotation and said one angular segment is less than one.

35. The method as defined in claim 32 in which said providing step further includes providing first and second sensing units adapted to develop first and second pairs of phase-shifted signals from which said first and second sinusoidal signals are provided.

* * * * *